June 29, 1948.　　　　A. L. BEST　　　　2,444,150
PROCESS FOR MAKING INFLATABLE ARTICLES
Filed May 2, 1947
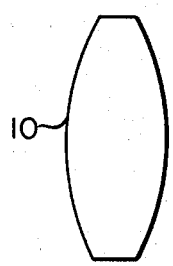
FIG. 1
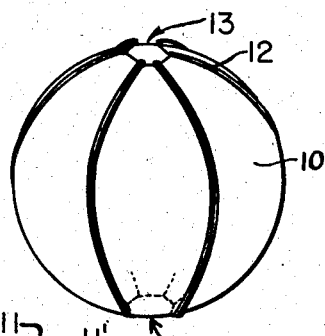
FIG. 2
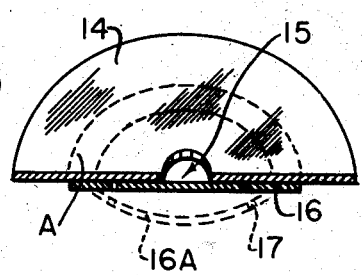
FIG. 4
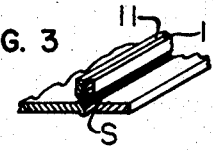
FIG. 3
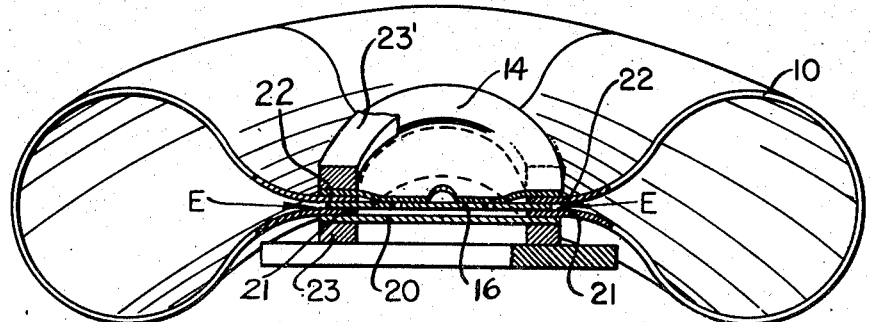
FIG. 5
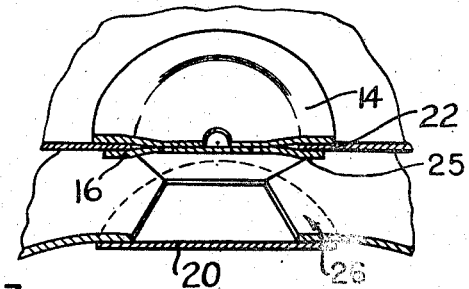
FIG. 6
FIG. 7
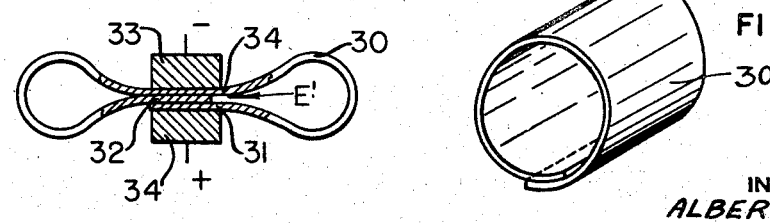
FIG. 8
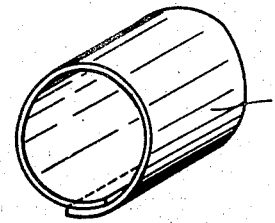
INVENTOR
ALBERT L. BEST
BY
　　Worth Wade
ATTORNEY Patented June 29, 1948

2,444,150

UNITED STATES PATENT OFFICE 2,444,150

PROCESS FOR MAKING INFLATABLE ARTICLES

Albert L. Best, Darien, Conn.

Application May 2, 1947, Serial No. 745,465

9 Claims. (Cl. 154—85)

This invention relates in general to inflatable articles formed of plastic films and, in particular, to a process for producing such articles, and includes correlated improvements designed to facilitate the formation and sealing of such articles in a rapid and efficient manner.

Heretofore in the production of inflatable articles, such as rubber balls, inner tubes for tires and other ball-shaped or tube-shaped inflatable articles, it has been difficult to effect the sealing of the final opening. For example, in the formation of inflatable balls used by children or in games such as basketball, the ball is customarily formed from a plurality of elliptical-shaped segments which are sealed together along their longitudinal edges, leaving an opening at the ends of the segments. It is customary when producing such articles from rubber-sheeting plastic films to close the opening at the ends of the segments by a round piece of the same material, preferably by heat sealing. To seal such sheet material and close the opening, it is necessary to apply both pressure and heat. One convenient method of doing this is to flatten the article and close the opening on opposite sides at the same time by applying heat and pressure to the collapsed and contacting ends. When this is done, however, there is a tendency for the inner contiguous surfaces of the thermoplastic material to seal to themselves so that after the application of heat and pressure it is not possible to separate the inner surfaces and inflate the article. Many attempts have been made to use a separator between the inner contiguous surfaces formed of a non-thermoplastic sheet material; but this invariably results in sealing the separator within the ball, and when the ball is made of transparent materials, the presence of the separator detracts from the appearance and utility of the article.

Accordingly, it is the general object of the present invention to provide a simple and efficient manner for completely closing or sealing inflatable articles of the class of balls and tubing without the use of internal sheet separators and without the use of an internal mandrel.

A specific object of the present invention is to provide an inflatable article of thermoplastic sheet material in which all the seams are sealed by fusion of the material without materially detracting from the appearance, color or transparency of the material.

It is a further specific object of the invention to provide an inflatable ball of thermoplastic sheet material in which the majority of the seams are internally sealed.

Other objects of the invention will in part be obvious and will in part appear hereinafter.

According to the present invention an inflatable article is produced by sealing together the contiguous surfaces to form seams and closing the article by collapsing it upon its end, closing the final opening by fuse-sealing of a sheet of thermoplastic material disposed over the opening, the contiguous surfaces of the collapsed article being prevented from fusing to each other by the presence between such surfaces of a coating of a material which is not rendered tacky at the temperature at which the thermoplastic sheet material is rendered tacky, thereby permitting separation of such surfaces after fusion sealing.

For a more complete understanding of the nature and objects of the invention, reference should be had to the accompanying drawings, in which:

Fig. 1 represents in side elevation one segment of thermoplastic material for use in producing one embodiment of the article of the invention;

Fig. 2 is a perspective view of one embodiment of the article of the invention after sealing of the longitudinal seams;

Fig. 3 is an enlarged perspective view of one of the longitudinal seams of the article shown in Fig. 2;

Fig. 4 is a cross-section of one embodiment of a valve capable of being used in forming the article of the invention;

Fig. 5 is a perspective view, partly in section, illustrating one step in the process of the invention;

Fig. 6 is a perspective view, partly in section, of the article of Fig. 5 at a later stage in the process;

Fig. 7 is a cross-section of another embodiment of the article showing a method of formation; and Fig. 8 is a perspective view of the article shown in Fig. 7 after completion of the process.

The invention is applicable for the production of inflated articles in general, but in particular to inflated articles of the type which are balls and which must be sealed completely. However, the invention is also applicable for producing seamed tubing of long lengths without the use of a mandrel, inner tubes, and air bags for use in vulcanizing and molding processes.

The articles may be produced from thermoplastic material as a class such, for example, as natural or synthetic rubber, thermoplastic resins as a class, thermoplastic organic derivatives of cellulose such as cellulose esters, cellulose ethers, and cellulose esters-ethers, and mixtures of these thermoplastic materials. Generally speaking, the articles are fabricated from sheets or films of the thermoplastic materials, the edges being brought together and sealed by fusion. The fusion may be effected by the application of heat and pressure, the heat being produced by steam, hot water or electrical heating units or preferably by electrical induction using high frequency currents.

By way of illustrating, but not by way of limiting the invention, the process will be described in the production of a ball and of seamed tubing.

The production of a ball according to the invention is illustrated in Figs. 1 to 6 inclusive. Referring to Figs. 1, 2 and 3, the ball may be constructed by taking elliptical-shaped segments 10 and sealing their longitudinal edges 11, 11' together, as shown in Fig. 3, the area of the fusion sealing being indicated by the letter S. In a preferred embodiment the seams are formed with the material turned inside-out so that the seams form upstanding ribs 12, as shown in Fig. 2. The excess material of the ribs which extends beyond the sealed area S may be torn or cut away. The partly formed ball is then turned right-side-out through one of the open ends 13. The ball is now completely sealed except for the open ends 13 which have to be closed.

Since it is necessary to provide the ball with inflating means such as an air valve, it is convenient to make use of the end closures for this purpose. In Fig. 4 there is illustrated one embodiment of a suitable air valve which comprises an outer disc 14 having a central large aperture 15 and being sealed by adhesive or fusion in the area A to a second disc 16 which is provided with at least one aperture 17 which is offset in its relation to the aperture 15 of the top sheet 14. When air is blown through the aperture 15, it will cause the lower sheet 16 to bend downward to the position shown by the broken lines 16A, in which position air can flow into the interior through the aperture 17. When the air is cut off, the pressure inside will force the disc 16 against the outer disc 14 and thus effectively seal all of the apertures.

In sealing the open ends of the ball, the partly formed bag is collapsed so that the open ends are superimposed as shown in Fig. 5. Over the lower opening there is disposed a disc of thermoplastic material 20 so that it overlaps the edges 21 of the segments 10. The upper edges 22 are enclosed between the unsealed marginal edges of the disc 14 and 16, as shown in Fig. 5.

The collapsed article as thus arranged is then positioned on a ring-shaped platen 23 of metal, and a second ring-shaped platen of similar size is then placed on top of the disc 14 so that the overlapping edges can be squeezed and pressed between the disc 23, 23'. To prevent the edges of the disc 16 from adhering to the contiguous surfaces of the edges 21 on which it rests, these surfaces are coated with a relatively non-thermoplastic material, i. e., material which does not become tacky at the temperature at which the thermoplastic surfaces become tacky. Various substances may be used to prevent sticking of the surfaces during sealing, such, for example, as:

(a) Organic filament-forming plastics which have a thermal tacking point higher than the thermal tacking point of the contiguous surfaces. For example, when the article is made of low-melting thermoplastic resins, such as polyvinyl resins, polyethylene resins.

The anti-sticking material may be a higher melting material such as cellulose acetate, polyvinyl chloride, polyvinyl butyral, such higher melting materials being disssolved in a suitable volatile organic solvent such as acetone, chlorinated hydrocarbons, and the solution applied between the contiguous surfaces in the area indicated by the letter E, after which the solvent is evaporated and the sealing then carried out. The evaporation of the solvent leaves a thin filament which is not apparent and does not detract from the appearance of the article after the article has been sealed and inflated.

(b) Non-thermoplastic materials as a class, such, for example, as hydrocolloids, e. g., gelatin, starch, water-soluble cellulose ethers, polyvinyl alcohol (in the water-soluble stage). It is characteristic of these hydrophilic colloids that they are not compatible with the contiguous surfaces of the plastic sheeting at the temperature of fusion of the sheeting. The hydrophilic colloids may be applied by dispersing them in water or aqueous medium and applying the solution to the contiguous surfaces E and evaporating the water to leave a thin film of the colloid on the contiguous surfaces.

After the surfaces have been sealed, the closed ends of the bag are separated as shown in Fig. 6, the separation being facilitated by the fact that the surface 25 has not adhered and fused to the surface 26, thus permitting the article to be expanded by inflation.

It is to be understood that the invention is not limited to the formation of balls. Figs. 7 and 8 illustrate the production of tubing according to the present invention. Referring to Fig. 7, a longitudinal strip of material 30 is folded upon itself so that the edges 31 and 32 are in overlapping relation, as shown. The tubing thus formed is collapsed upon itself to facilitate the fusion sealing by means of the electrodes 33 and 34. To prevent the inner surface of the tube from sealing together at the point E', these contiguous surfaces are first coated before the tube is formed with the anti-sticking material of the class above described. After fusion of the edges 31 and 32, the top 34 of the tube can be separated from the contacting inner surface of the edge 32, and the tubing will assume, upon inflation, the cylindrical form shown in Fig. 8.

It is apparent from the above description that the invention enables the formation of completely sealed hollow bodies from thermoplastic sheet material or of long lengths of tubing without use of an internal mandrel to prevent the inner surfaces from sealing together during the sealing of the seams. The invention is capable of many variations. For example, instead of using the leaf-valve of the type shown in Fig. 4, a conventional needle valve of the type used on bicycle tires and other pneumatic tubes may be employed, and such a valve may be inserted either in the end closure or in the side walls of the article. When inserted in the side walls, the closure, as shown in Fig. 5, may comprise on both ends a single disc of material.

Having described my invention what I claim as new and desire to secure by Letters Patent is:

1. In a process for forming a hollow article from plastic sheet material, these steps comprising coating contiguous surfaces overlying the area to be sealed by fusion, said coating comprising a material which is not rendered tacky at the temperature at which the thermoplastic sheet material is rendered tacky, forming a seal in a wall of said article by applying heat and pressure through said coated area, thereafter separating said coated surfaces whereby the article may be distended.

2. A process according to claim 1 in which the article is tubular and the seam comprises overlapping edges.

3. A process according to claim 1 in which the article is spherical.

4. In a process for forming an inflated ball from thermoplastic sheet material these steps comprising cutting said sheet material into oblong sections, heat sealing said sections along their edges to form a spherical article having two opposing openings, coating interior surfaces adjacent one of said openings, applying discs of thermoplastic sheet material over said openings, collapsing said article to bring said openings in contiguous relation, and heat sealing said discs to the areas surrounding said openings by applying heat and pressure to said collapsed article and thereafter distending said article, the coating on said interior surface comprising a material which is not rendered tacky at that temperature at which said thermoplastic sheet material is rendered tacky.

5. A process according to claim 4, in which the article is turned inside out after the segments are united but before closing the openings.

6. A process according to claim 4 in which the thermoplastic sheet material is a thermoplastic organic derivative of cellulose.

7. A process according to claim 4 in which the coating material comprises a hydrophilic colloid.

8. A process according to claim 4 in which the coating material comprises a film-forming plastic having thermotacking point higher than the thermotacking point of the sheet material forming said article.

9. A process according to claim 4 in which the coating material is a material which is incompatible with the thermoplastic sheet material at the temperature used in heat sealing.

ALBERT L. BEST.

REFERENCES CITED

The following references are of record in the file of this patent:

UNITED STATES PATENTS

| Number | Name | Date |
|---|---|---|
| 1,458,672 | Witmer et al. | June 12, 1923 |
| 2,025,918 | Van Cleef | Dec. 31, 1935 |

FOREIGN PATENTS

| Number | Country | Date |
|---|---|---|
| 301,302 | Great Britain | Dec. 5, 1929 |